United States Patent
Cernasov

(10) Patent No.: US 7,956,981 B2
(45) Date of Patent: Jun. 7, 2011

(54) LCD BASED ENVIRONMENT SCANNER AND 3-D DISPLAY

(75) Inventor: Andrei Cernasov, Ringwood, NJ (US)

(73) Assignee: Honeywell International Inc., Morristown, NJ (US)

( * ) Notice: Subject to any disclaimer, the term of this patent is extended or adjusted under 35 U.S.C. 154(b) by 1250 days.

(21) Appl. No.: 11/586,698

(22) Filed: Oct. 26, 2006

(65) Prior Publication Data

US 2008/0100547 A1 May 1, 2008

(51) Int. Cl.
*G02F 1/13* (2006.01)
*G02B 5/32* (2006.01)
*G02B 26/10* (2006.01)

(52) U.S. Cl. .............. 349/200; 349/1; 349/199; 359/17

(58) Field of Classification Search .................. None
See application file for complete search history.

(56) References Cited

U.S. PATENT DOCUMENTS

| | | | | |
|---|---|---|---|---|
| 5,311,220 A * | 5/1994 | Eichenlaub | | 348/55 |
| 6,169,594 B1 * | 1/2001 | Aye et al. | | 349/196 |
| 6,469,754 B1 * | 10/2002 | Okumura | | 349/2 |
| 7,061,678 B1 * | 6/2006 | Chikazawa | | 359/464 |
| 7,068,333 B2 * | 6/2006 | Ohashi et al. | | 349/68 |
| 7,385,655 B2 * | 6/2008 | Imai et al. | | 349/74 |
| 7,515,243 B2 * | 4/2009 | Watamura | | 349/192 |
| 7,525,615 B2 * | 4/2009 | Zhang et al. | | 349/116 |
| 7,580,084 B2 * | 8/2009 | Yu et al. | | 349/12 |
| 2006/0285068 A1 * | 12/2006 | Kawada et al. | | 349/192 |

OTHER PUBLICATIONS

Halle, Michael, Autosteroscopic displays and computer graphics: *Computer Graphics*, ACM SIGGRAPH, 31(2), May 1997 pp. 58-62.

* cited by examiner

*Primary Examiner* — Tina M Wong
(74) *Attorney, Agent, or Firm* — Ingrassia Fisher & Lorenz, P.C.

(57) ABSTRACT

A liquid crystal display (LCD) device (100) has the dual functionality of image display and environment scanning. Specifically, during environment scanning mode, the LCD device searches for targets, i.e., markers (700) in the environment. To enable such scanning, the LC layer (20) is configured to provide a scanning optical path allowing passage of a directional marker signal. The scanning optical path is controlled according to one or more transparent openings programmed to scan at least part of the LC layer. As a marker (700) is detected, based on the marker signal, a positional coordinate (e.g., relative angular position) is determinable based on the current scan position of the transparent opening(s).

20 Claims, 17 Drawing Sheets

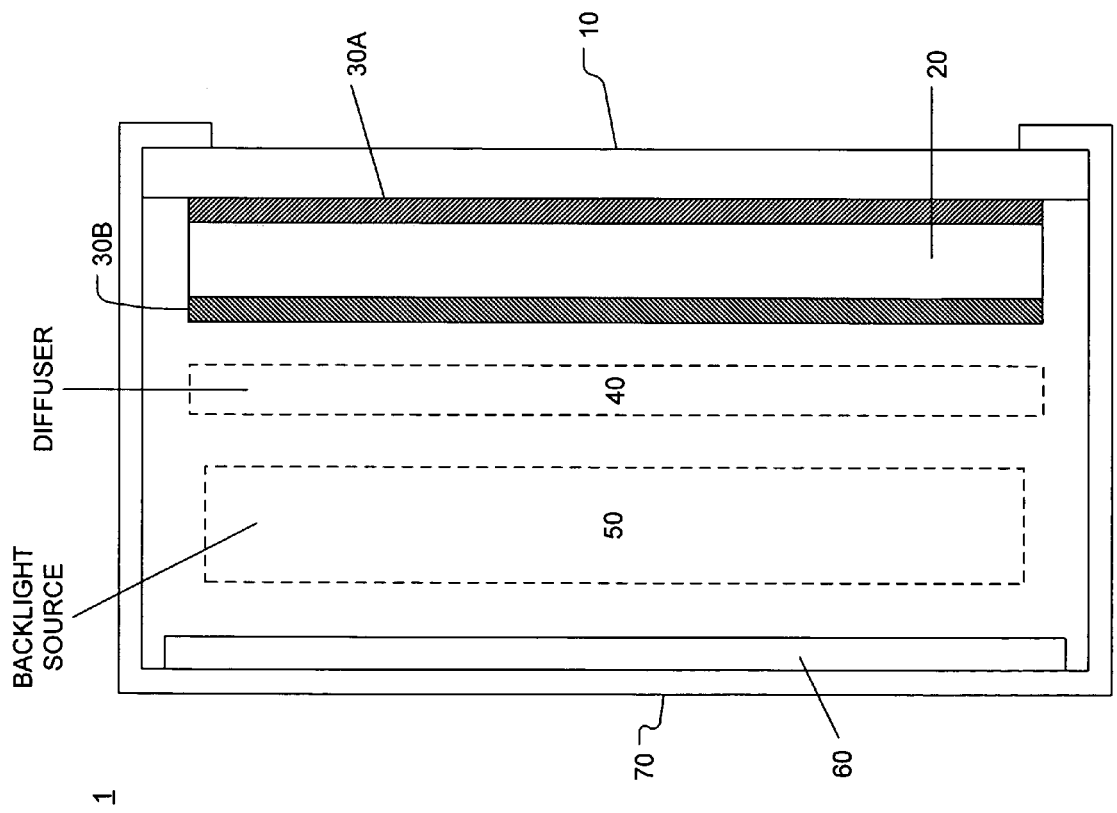

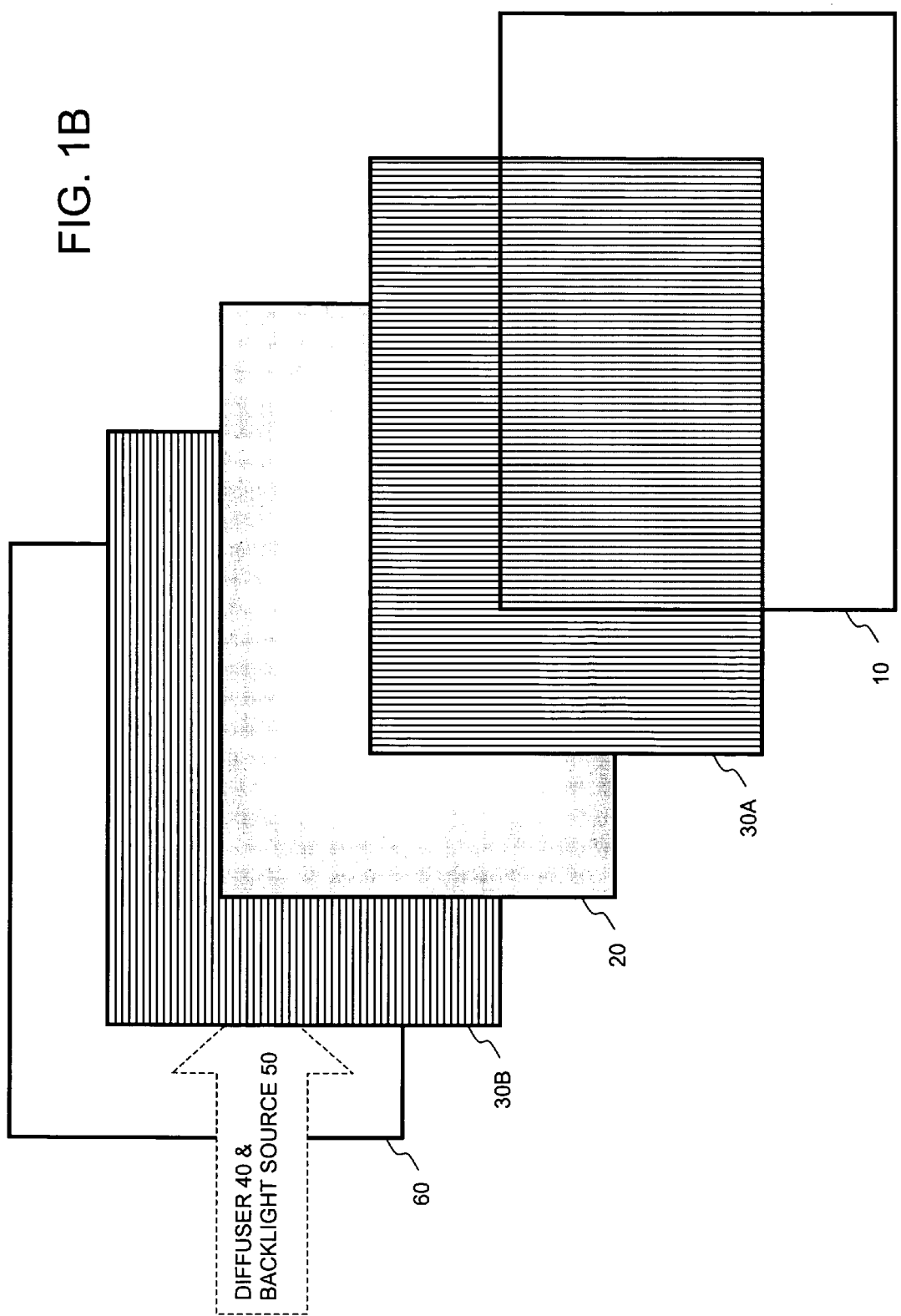

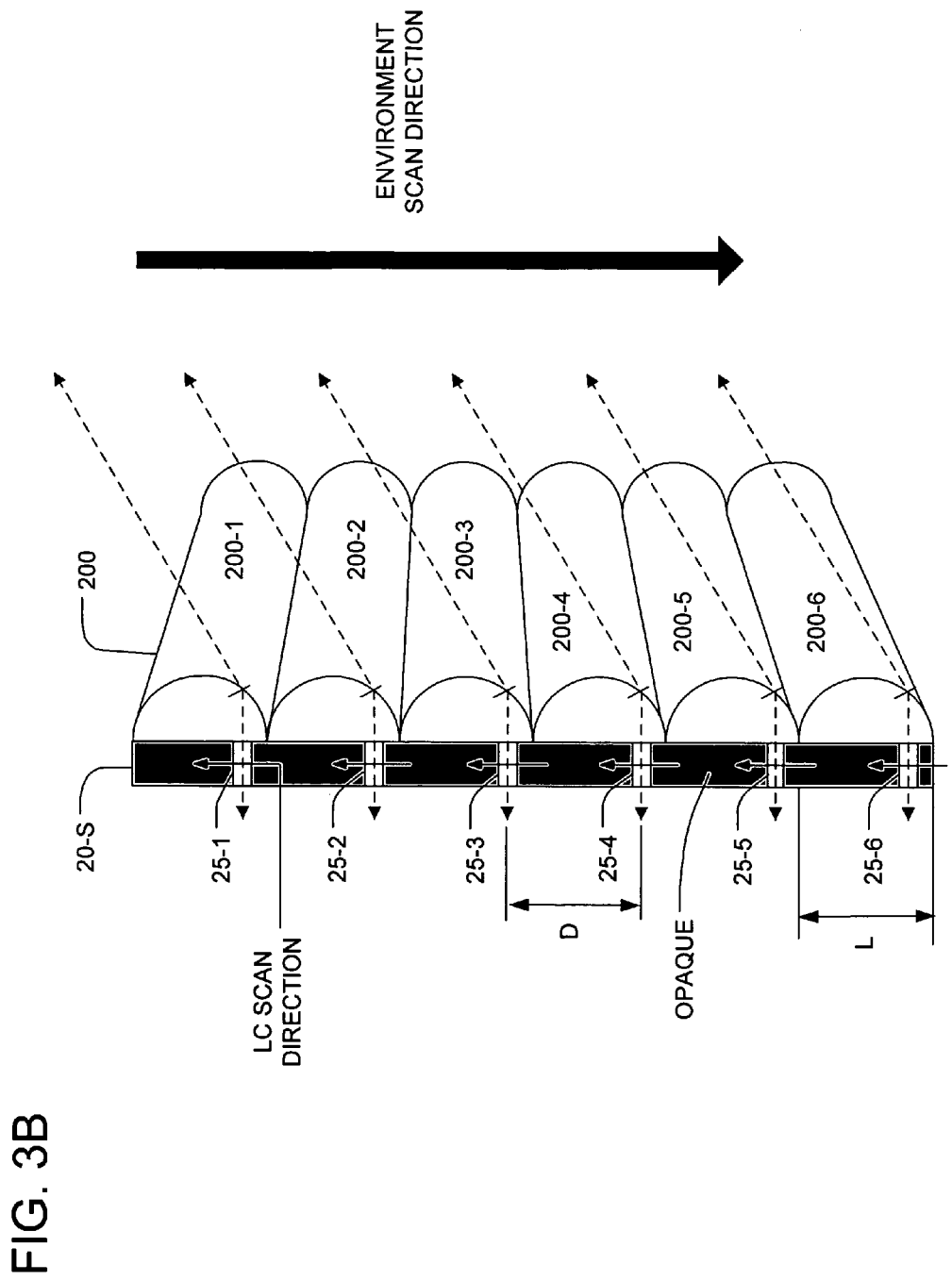

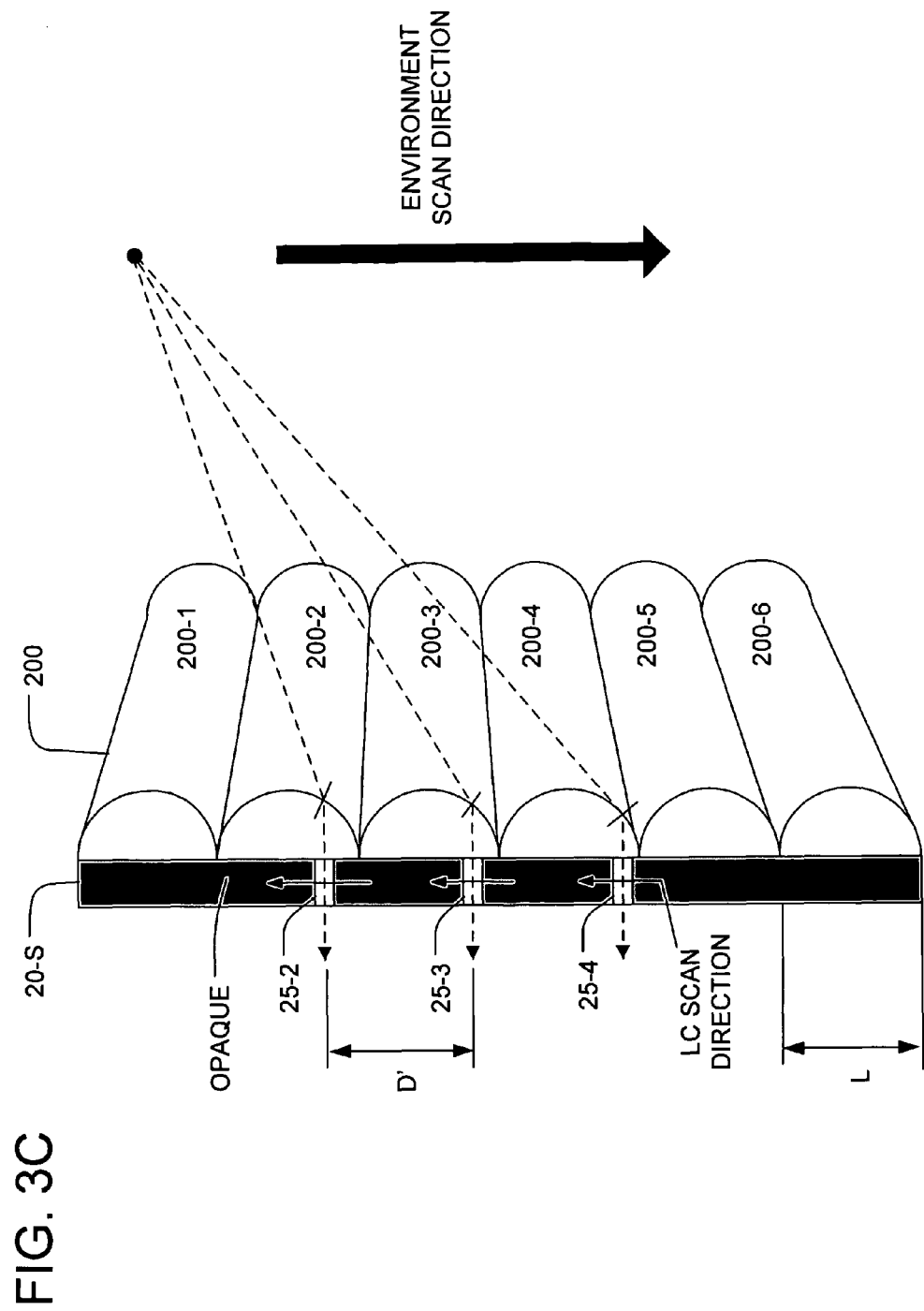

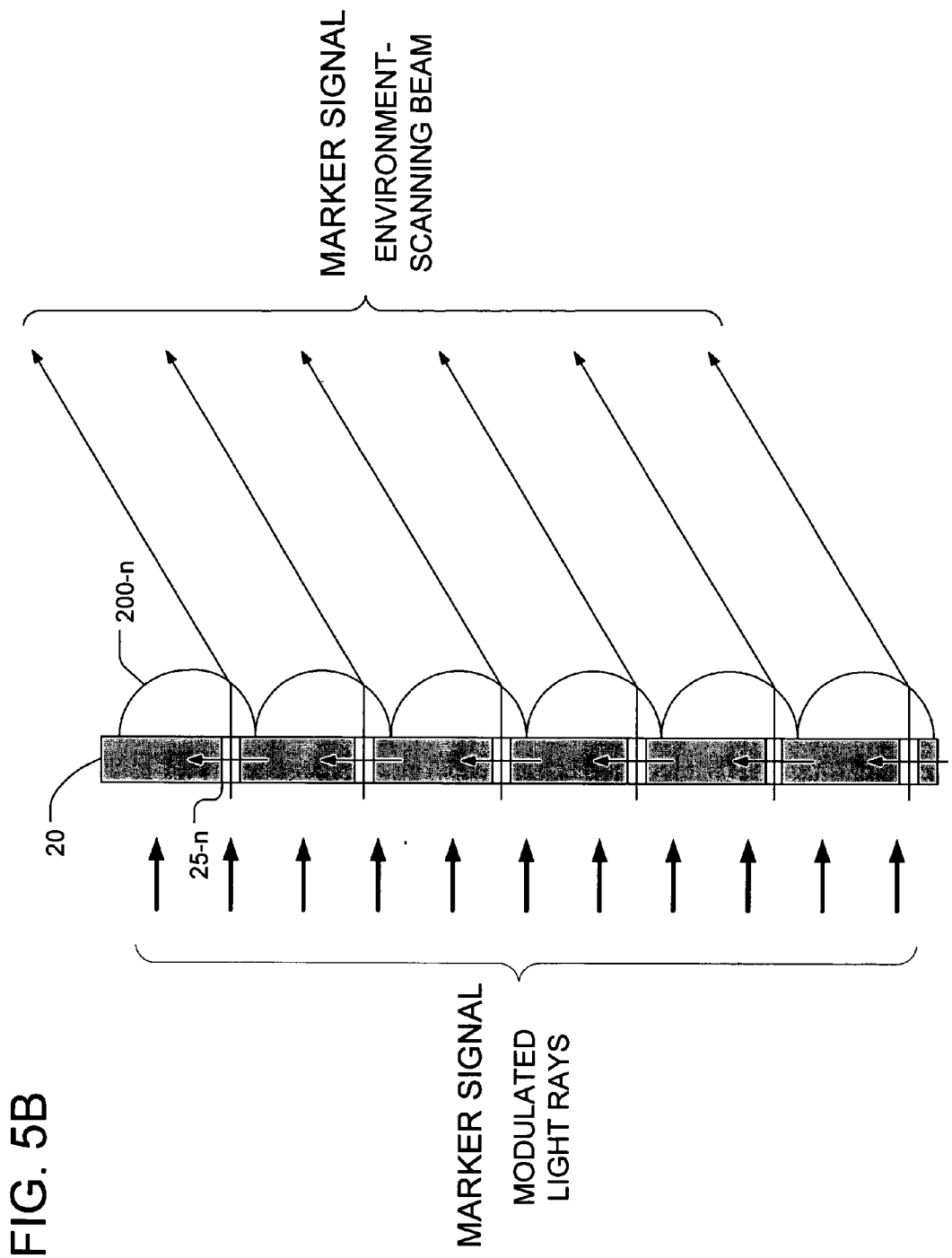

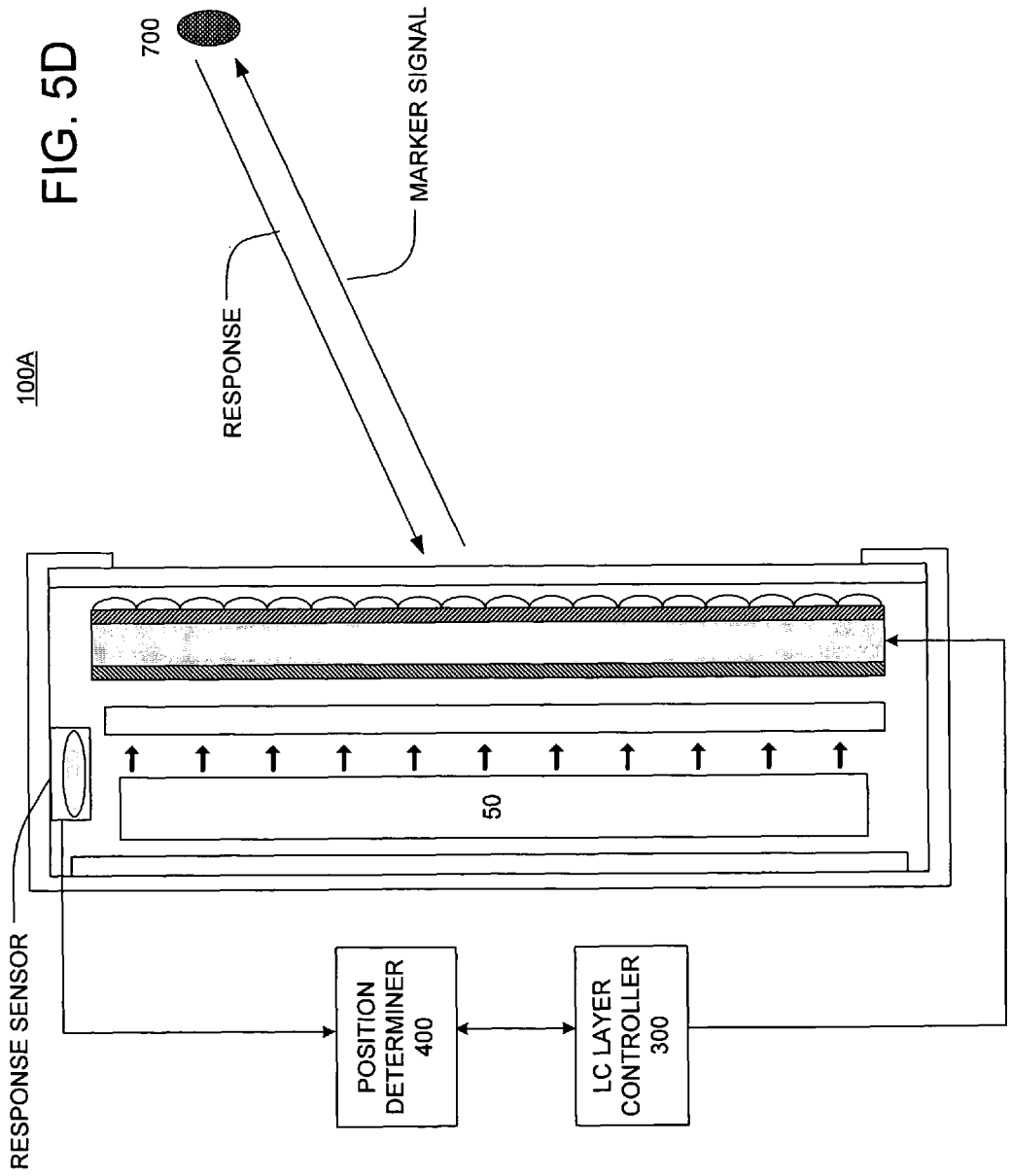

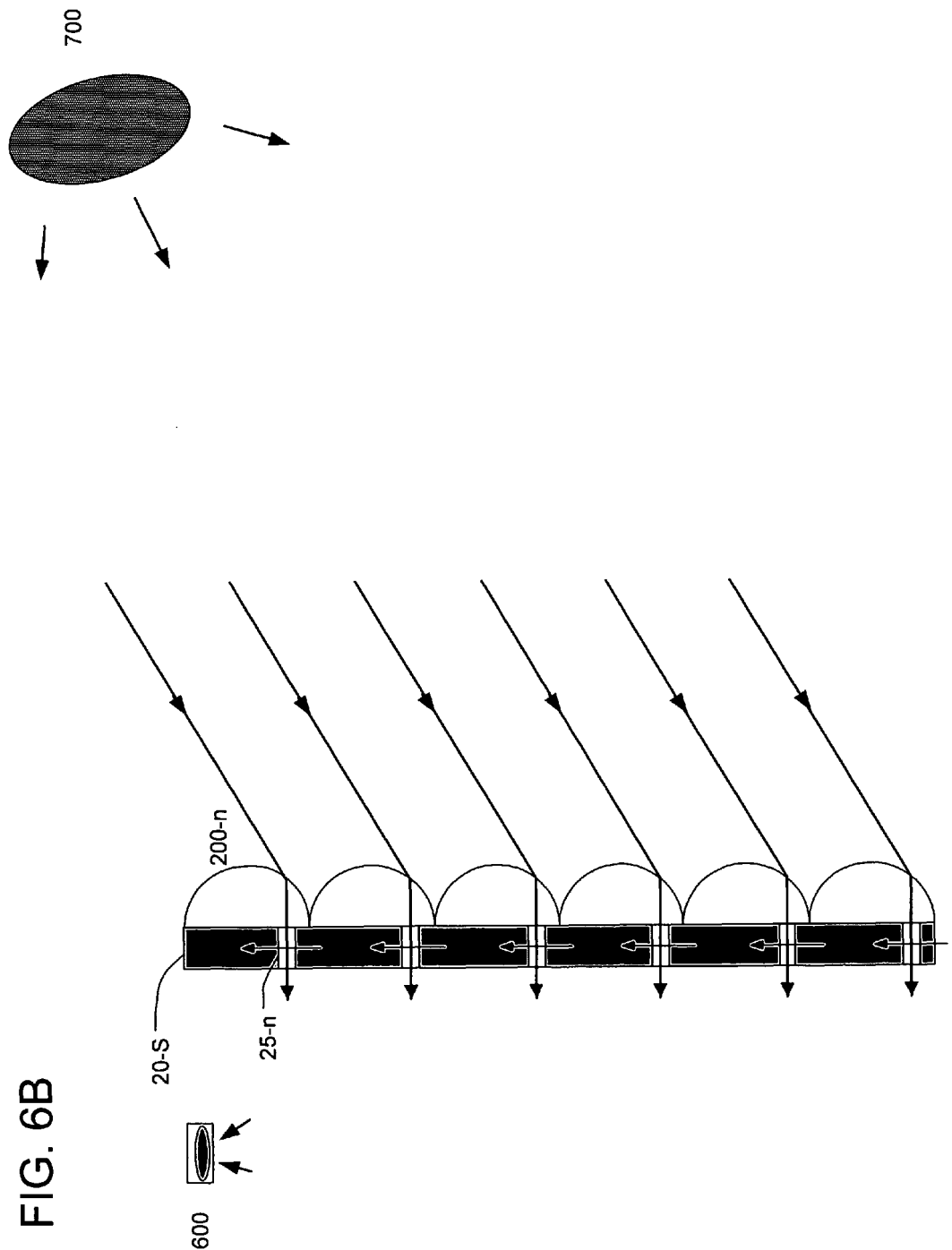

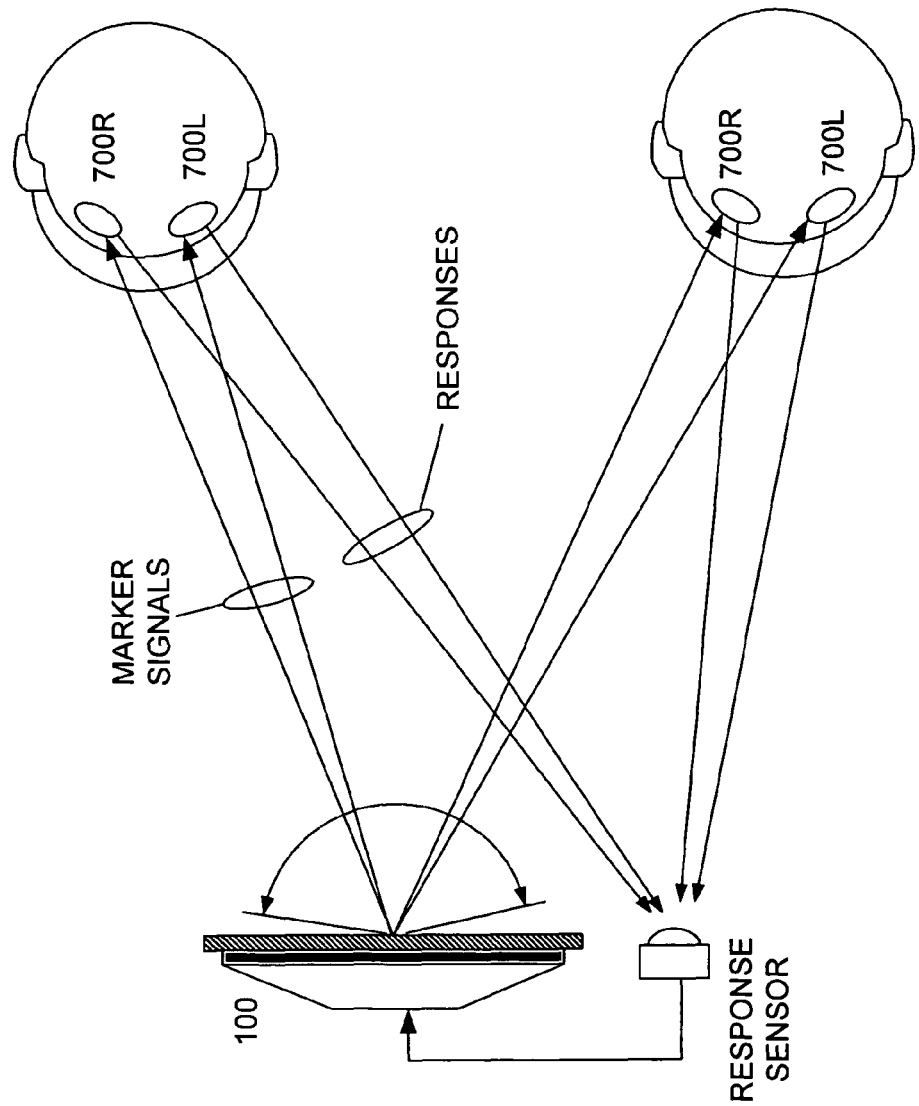

LCD BASED ENVIRONMENT SCANNER AND 3-D DISPLAY

BACKGROUND OF THE INVENTION

1. Field of the Invention

The present invention relates to a liquid crystal display (LCD) device adapted to scan its environment.

2. Description of the Related Art

Detailed knowledge about the surrounding environment is often needed, and is many times essential, for efficient extraction of information about the environment. In some applications, detailed knowledge about the position of moving/moveable objects is needed.

A conventional method of tracking targeted objects in an environment is to use one or more cameras. However, some applications might require information about the objects' relative positions with respect to a different originating point than the camera. For example, in certain types of image display applications, it might be advantageous to make the image content dependent upon the viewers' positions with respect to the display panel. Furthermore, image display techniques are being developed in which information regarding viewers' positions is used for improving display quality. If a camera is used for tracking the position of viewers of an image display, the perspective of the tracking images needs to be mathematically transformed to reflect the positions of the viewers with respect to the display panel, rather than the camera lens. This transformation process is both slow and expensive.

Thus, it would be advantageous for certain display applications, particularly, those utilizing liquid crystal display (LCD) devices, to incorporate into the display device the added functionality of scanning the environment for targeted objects.

SUMMARY OF THE INVENTION

The present invention is directed to apparatuses and methods that allow a liquid crystal display (LCD) device to be used as an optical environment scanner. Thus, the LCD device may be configured for dual functions of displaying information and tracking the positions of targeted objects, e.g., viewers.

In an exemplary embodiment, while operating in scanning mode, an LCD controller may be configured to control an optical path, which allows passage of a directional marker signal through the LC layer. Particularly, this optical pathway scans at least part of the liquid crystal (LC) layer during scanning mode. Further, the marker signal may originate from within the LCD device, or from an external source.

According to an embodiment in which the marker signal is generated from within the LCD device, directionality is imposed on the signal by the optical path. Thus, by controlling the optical path, the LCD device uses the marker signal to scan the environment for markers. A response sensor (internal or external to the LCD device) may further be provided for detecting the reaction of each marker as it is struck by the scanned signal. For example, a particular marker may be designed to actively detect the marker signal and generate an acknowledgement upon being struck. Alternatively, a marker may merely reflect the marker signal back to the response sensor. Since the marker signal is directional, information of each marker's position relative to the LCD panel may be determined based on the particular scan interval in which the marker's reaction is detected.

According to an alternative embodiment, the marker signal may originate from the markers themselves. A marker signal sensor may be implemented within the LCD device, behind the LC layer. During each scan interval, the optical path is designed only to allow the marker signal to enter from a particular direction/location. Thus, as the optical path is being controlled, the LCD device obtains information of each marker's relative position based on the particular scan interval during which the corresponding marker signal was detected.

In a further exemplary embodiment, the LCD device may be designed to scan the environment to detect the relative positions of persons viewing the device. In such an embodiment, each marker may correspond to an eyeball of a user. For instance, the viewer may wear a hat or helmet with two markers having substantially fixed position with respect to the viewer's left and right eyeballs, respectively. According to this embodiment, the LCD device may be capable of detecting the position of various viewers and, thus, may control image display accordingly.

BRIEF DESCRIPTION OF THE DRAWINGS

Further aspects and advantages of the present invention will become apparent upon reading the following detailed description in conjunction with the accompanying drawings, which are given by way of illustration only and, thus, are not limitative of the present invention. In these drawings, similar elements are referred to using similar reference numbers, wherein:

FIGS. 1A and 1B illustrate the configuration of a typical liquid crystal display (LCD) device;

FIG. 3B illustrates a scanning operation of an LCD-based environment scanning device using a cylindrical lens array producing optical paths in parallel, according to an exemplary embodiment of the present invention;

FIG. 3C illustrates a scanning operation of an LCD-based environment scanning device using a cylindrical lens array producing optical paths that converge, according to an exemplary embodiment of the present invention;

FIG. 5B illustrates an aspect of the embodiment in FIG. 5A, in which the scanning optical paths impose directionality to internally generated marker signal;

FIG. 5D illustrates an aspect of the embodiment in FIG. 5A, in which a response sensor implemented within the LCD stack may be used for detecting the reaction of markers in the environment;

FIG. 6B illustrates an aspect of the embodiment in FIG. 6A in which the scanning optical paths impose directionality to externally generated marker signal; and FIG. 7 illustrates a cockpit system in which the LCD-based environment may be implemented, according to an exemplary embodiment of the present invention.

DETAILED DESCRIPTION

Figure 2A:
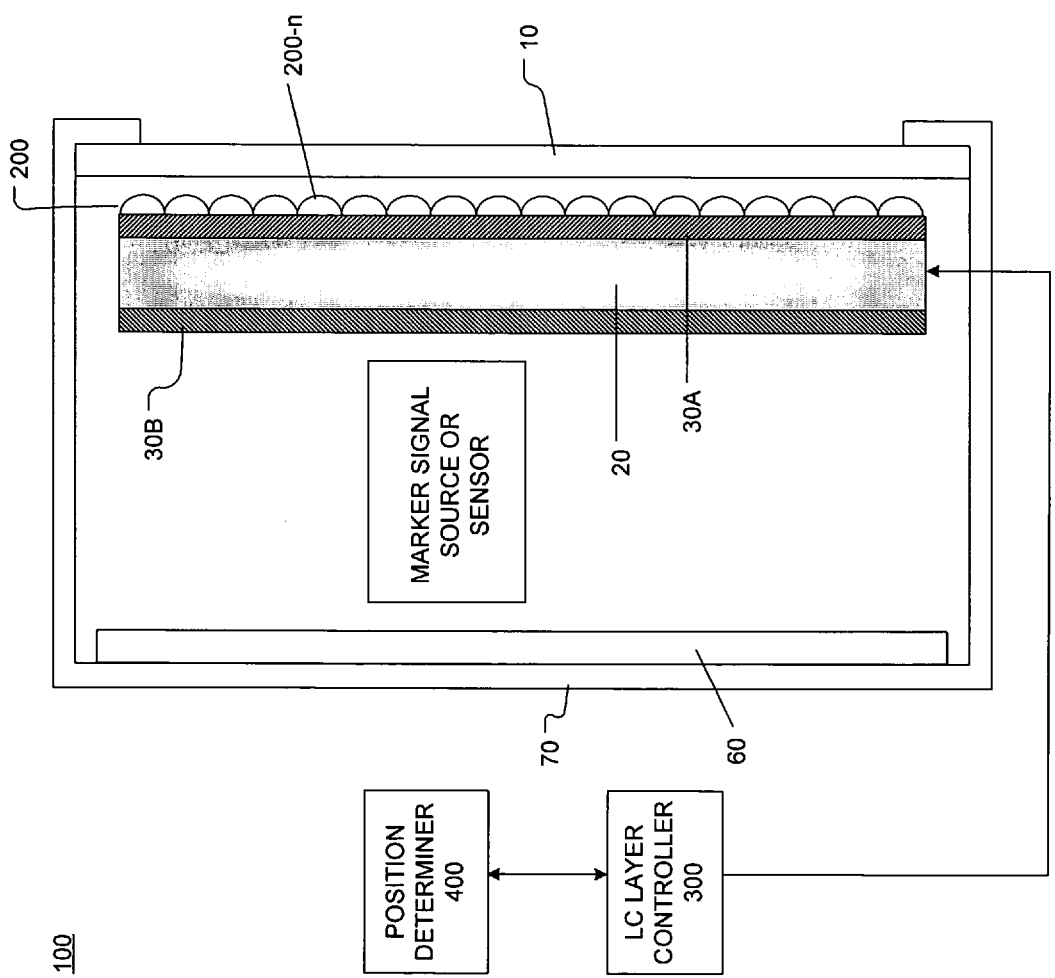
FIG. 2A illustrates the configuration of an LCD-based environment scanning device, according to an exemplary embodiment of the present invention.

Aspects of the invention are more specifically set forth in the accompanying description with reference to the appended figures. It should be noted that these figures are merely provided for illustration purposes. As such, these figures are not drawn to scale, and no effort has been made to ensure that the relative thicknesses, sizes, and shapes illustrated therein are correct.

The configuration of a typical LCD device is illustrated in FIGS. 1A and 1B. As shown in FIG. 1A, a typical LCD device 1 includes a liquid crystal (LC) layer 20 sandwiched between two polarizing filters 30A and 30B (hereafter "polarizers"). The LC layer is protected by a transparent front protective sheet 10, e.g., a glass plate.

For a backlit LCD device 1, behind the LC and polarizing layers are a light diffusing film 40 (hereafter "diffuser"), a backlight source 50, and a reflective surface 60. However, in a reflective-type LCD device 1, the diffuser 40 and backlight source 50 are generally omitted. Thus, the diffuser 40 and backlight source 50 are illustrated by dotted lines in FIG. 1A (for reflective-type LCD, the reflective layer 60 may optionally be designed with light diffusing qualities).

As shown in FIG. 1A, a casing or enclosure 70 is provided to hold the aforementioned layers in place. FIG. 1B illustrates an exploded view of the stack of LCD layers described above. The specification may collectively refer to these layers as the "LCD stack" of a backlit LCD device (including diffuser 40 and backlight source 50) or a reflective-type LCD device (without diffuser 40 or backlight source 50).

Furthermore, for certain types of LCD applications, it is known that an optical layer (not shown) may optionally be placed in front of the LC layer 20. The optical layer (not shown) may include an array of lenses to impose certain desired effects on the image.

FIG. 2A conceptually illustrates the configuration of a liquid crystal display (LCD) device used as an environment scanner, according to an embodiment of the present invention. Since the LCD device 100 of FIG. 2 may be either a backlit or reflective-type LCD, the backlight source and diffusive layer are not expressly illustrated. However, it will be readily apparent that the LCD device 100 of this figure may include any of the layers of a typical LCD stack, as described above in connection with FIGS. 1A and 1B.

In FIG. 2A, the LCD device 100 includes an optical layer 200 disposed in front of the LC layer 20 (and polarizers 30A and 30B). According to an exemplary embodiment, the optical layer 200 may comprise an array of lenticular elements or lenses 200-n. Examples of this will be described in more detail below in connection with FIGS. 3A and 3B. However, the optical layer 200 may also comprise other optical systems for deflecting or redirecting light entering/exiting the LCD device 100 in a designed manner, as will be contemplated by those of ordinary skill in the art.

As illustrated in FIG. 2A, the LCD device 100 further includes an LC layer controller 300 and a position determiner unit 400. The LC layer controller 300 may be designed similar to those known in the art, i.e., for controlling the image display function of the LC layer 20. However, in an exemplary embodiment, the LC layer controller 300 is also programmed for controlling the LC layer 20 while the LCD device 100 is operating in an environment-scanning mode (this scanning mode may be interleaved with normal display mode).

Particularly, in scanning mode, the LC layer controller 300 controls one or more optical paths, which allow passage of a directional signal (referred herein as a "marker signal") through the LC layer 20. This marker signal is used for detecting the position of targeted objects (referred herein as "markers") in the LCD device's 100 environment, i.e., viewing range. By scanning the optical path(s) through at least a portion of the LC layer 20, the LC layer controller 300 enables the environment to be scanned in search of these markers. Even though multiple optical paths may be provided for the marker signal, the term "scanning optical path" will be used herein below to collectively refer to the one or more optical paths controlled by the LC layer controller 300 to scan the environment.

Figure 2B:
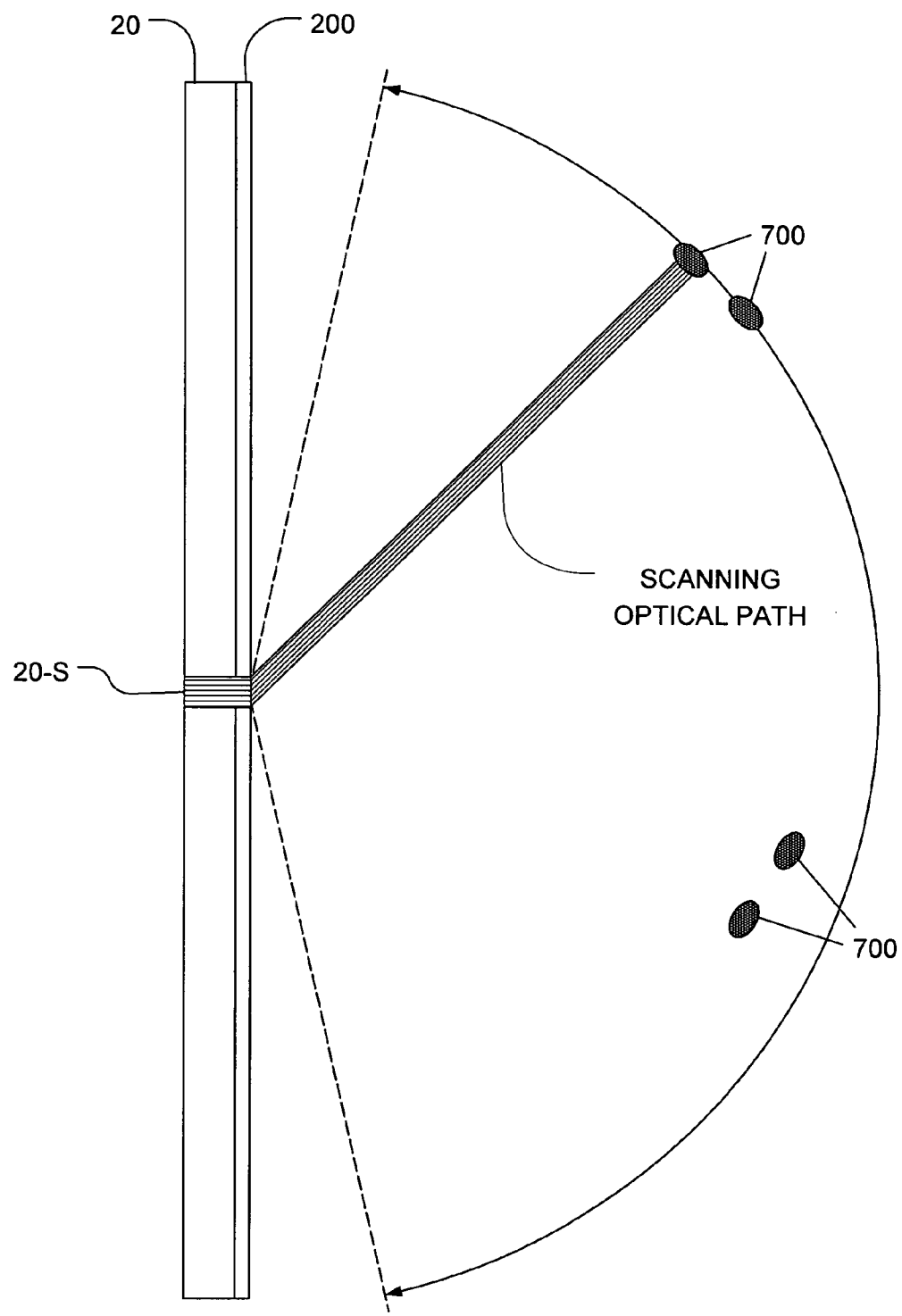
FIG. 2B illustrates the scanning portion in the liquid crystal (LC) layer, and the scanning range of an LCD-based environment scanning device, according to an exemplary embodiment of the present invention.

For example, as illustrated in FIG. 2B, the scanning optical path may be controlled by the LC layer controller 300 to scan through only a portion 20-S (referred herein as "scanning portion") of the LC layer 20. Through this scanning operation, the LC controller 300 causes the scanning optical path to scan the environment and intersect various markers 700, as illustrated in FIG. 2B. Detailed examples of this scanning operation will be provided below in connection with FIGS. 3B, 3C, 4B and 4C. It should be noted that the scanning portion 20-S does not need to be very large. In fact, the size of the scanning portion 20-S may be just a few pixels wide.

According to alternative embodiments of the invention, which will be described in more detail below in connection with FIGS. 5A and 6A, the marker signal may originate from either within the LCD stack, or external to the LCD device 100. In both of these embodiments, however, the LC layer controller 300 applies the same principles of operation in controlling the scanning optical path. This is due to the bidirectional nature of the optical path and LC layer 20.

Referring again to FIG. 2A, the LCD device 100 may further include a position determiner unit 400 for determining positional information of each marker detected according to the environment scanning process. This determination may be made in accordance with the current position of the scanning optical path when each marker is detected. Thus, the position determiner unit 400 may have a communicative link with the LC layer controller 300 to determine the status of the scanning optical path(s). Also, the position determiner unit 400 should have an input (not shown) to receive notification when a marker is detected in the environment using the marker signal.

As described above, the marker signal may be created either within the LCD stack, or external to the LCD device 100. When the marker signal is created within the LCD stack, it is transmitted via the scanning optical path in order to scan the environment. Alternatively, when the marker signal is originated externally (i.e., transmitted by markers in the environment), a marker signal sensor is implemented within the LCD stack to detect the signal as it enters the LCD device 100 via the optical path. These alternative embodiments will be described in more detail below in connection with FIGS. 6 and 7, respectively.

Next, the principles of operation for the LC layer controller 300 in controlling the scanning optical path will be described. In scanning mode, the LC layer controller 300 controls the LC layer 20 in such a manner as to provide one or more transparent openings to scan through the scanning portion 20-S of the LC layer 20. As used in this specification, "transparent opening" refers to a cell or group of cells in the LC layer 20 that, during the scanning mode of operation, is made optically clear (i.e., allowing the marker signal to pass through), while the rest of the LC layer 20 is made opaque (i.e., blocking the marker signal). Thus, the LC layer 20 does not need a special configuration, or additional elements, to provide transparent openings. Instead, the transparent openings are merely portions of a typical LC layer 20 that are programmed to be optically transparent by the LC layer controller 300.

The configuration of optical layer 200 and the scan position(s) of the transparent opening(s) are determinative of the optical path for the marker signal during a particular scan interval. According to an exemplary embodiment, the optical layer 200 may be an array of lenses 200-$n$ placed in front of the LC layer 20. The optical layer 200 may be comprised either of a set of cylindrical lenses 200-$n$ (illustrated in FIGS. 3A-3C) or spherical lenses (illustrated in FIGS. 4A-4C). While the figures illustrating these embodiments do not explicitly show the polarizing layers 30A and 30B, it should be noted that such layers (as well as driving electrodes, etc.) are implicitly present.

Figure 3A:
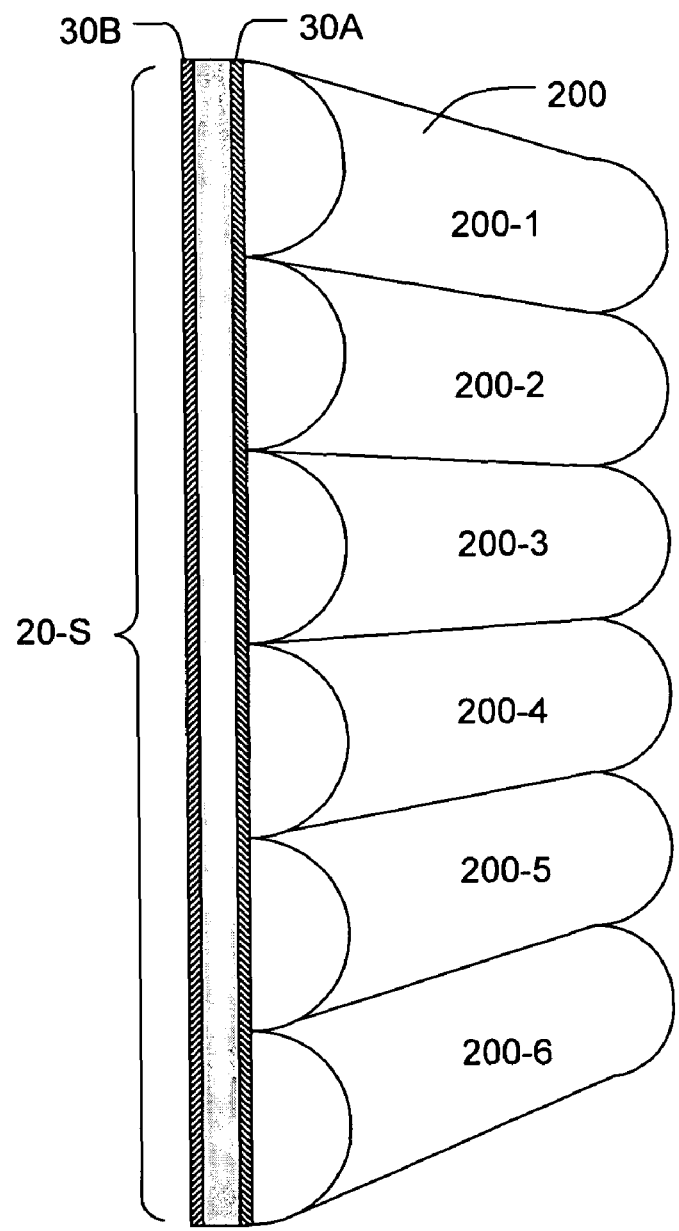
FIG. 3A illustrates a cylindrical lens array used as an optical layer for an LCD-based environment scanning device, according to an exemplary embodiment of the present invention.

First, the embodiment utilizing cylindrical lenses 200-$n$ will be described. FIG. 3A illustrates a perspective view, from above, of the scanning portion 20-S of LC layer 20 and optical layer 200, according to such an embodiment. FIG. 3A shows a specific example where the scanning portion 20-S corresponds to six cylindrical lenses 200-1 . . . 200-6. However, the scanning portion 20-S may correspond to any number of lenses as will be contemplated by those of ordinary skill in the art.

The array of cylindrical lenses 200-$n$ may cover all or part of the LC layer 20. For example, such arrays are already utilized in existing LCD panels to cover the entire LC layer 20 to achieve certain visual effects. However, it might be desired to cover only the scanning portion 20-S of the LC layer 20 with cylindrical lenses 200-$n$, such that a majority of the LC layer 20 is not covered.

FIGS. 3B and 3C illustrate the use of multiple transparent openings, which provide the scanning optical path for the marker signal during the environmental scanning mode of LCD device 100. Particularly, FIG. 3B illustrates an embodiment where the scanning optical path is comprised of multiple optical paths emanating from the device 100 in parallel. Alternatively, FIG. 3C illustrates an embodiment where the scanning optical path is comprised of multiple optical paths that converge after exiting the LCD device 100.

Referring to FIGS. 3B and 3C, these figures show the positions of a plurality of transparent openings 25-$n$ during a particular scan interval. The LC layer 20 is by default set to a state of opacity (blocking the passage of light) and, for each cylindrical lens 200-$n$, a transparent opening 25-$n$ is provided by programming one or more cells in the LC layer 20 to be optically transparent. Particularly, in FIGS. 3B and 3C, each transparent opening 25-$n$ in FIG. 3B is a vertical, relatively narrow band of LC cells programmed to be transparent. Each transparent opening 25-$n$ may span the height of the LC layer 20, or part thereof. For example, if the height of scanning portion 20-S is smaller than LC layer 20, the transparent openings 25-$n$ may merely span the height of scanning portion 20-S. The shapes and sizes of the transparent openings 25-$n$ may be adjusted depending on various design factors, such as the sizes of cylindrical lenses 200-$n$, the desired sizes of the optical paths, etc.

Further, as shown in FIGS. 3B and 3C, the transparent openings 25-$n$ synchronously scan their corresponding portions of the LC layer 20. As such, for the six cylindrical lenses 200-1 . . . 200-6, six transparent openings 25-1 . . . 25-6 are provided to synchronously scan the corresponding portions of the LC layer 20. As an example, these figures show the transparent openings 25-$n$ scanning in a particular direction ("LC scan direction"). The scan speed of the transparent openings 25-$n$ may be determined based on design factors, e.g., the frequency/duration at which the LCD device 100 operates according to environmental scanning mode.

As shown in FIGS. 3B and 3C, each transparent opening 25-$n$ and corresponding lens 200-$n$ is part of an optical path (illustrated by dotted lines) allowing light to travel from the interior of the LCD device 100 to the exterior environment, and vice versa. Particularly, due to the position of each transparent opening 25-$n$ and refractive quality of the corresponding lens 200-$n$, the resultant optical path would cause light originating within the LCD stack to exit the LCD display panel in an angular direction. Similarly, based on the position of the transparent opening and refractive quality of the lens 200-$n$, the resultant optical path would only allow those externally-generated light rays, which strike the LCD display panel at a corresponding angular direction, to pass through the LC layer 20 into LCD device 100.

As shown in FIGS. 3B and 3C, due to the refractive quality of the lenses 200-$n$, the optical paths will scan the environment in an direction ("environment scan direction") opposite to the scanning direction ("LC scan direction") of the transparent openings 25-$n$.

Further, the transparent openings 25-$n$ in FIGS. 3B and 3C synchronously scan their respective portions of the LC layer 20 in such manner that a constant distance D is maintained between each pair of consecutive transparent openings 25-$n$. FIG. 3B shows a particular embodiment in which the distance D is equal to the height L of each lens 200-$n$, thereby causing the resultant optical paths to be essentially parallel as they emanate from LCD device 100 into the environment. This is because the resultant optical paths intersect the same arcuate portions of the respective lenses 200-$n$.

On the other hand, FIG. 3C shows an embodiment where the distance D between consecutive transparent openings 25-$n$ is slightly larger than the height L of each lens 200-$n$, thereby causing the optical paths to converge in the environment. For example, it is contemplated that converging the optical paths in the environment would allow the marker signal to provide information regarding the depth of targets 700, rather than merely the horizontal position (this will be described in more detail below). In this embodiment, the distance D between consecutive transparent openings 25-$n$ can be modified, as necessary, to vary the point of convergence of the corresponding optical paths.

In the embodiment illustrated in FIGS. 3A-3C, the optical layer 200 is described as an array of cylindrical lenses 200-$n$. However, alternative configurations of the optical layer 200 are possible.

Figure 4A:
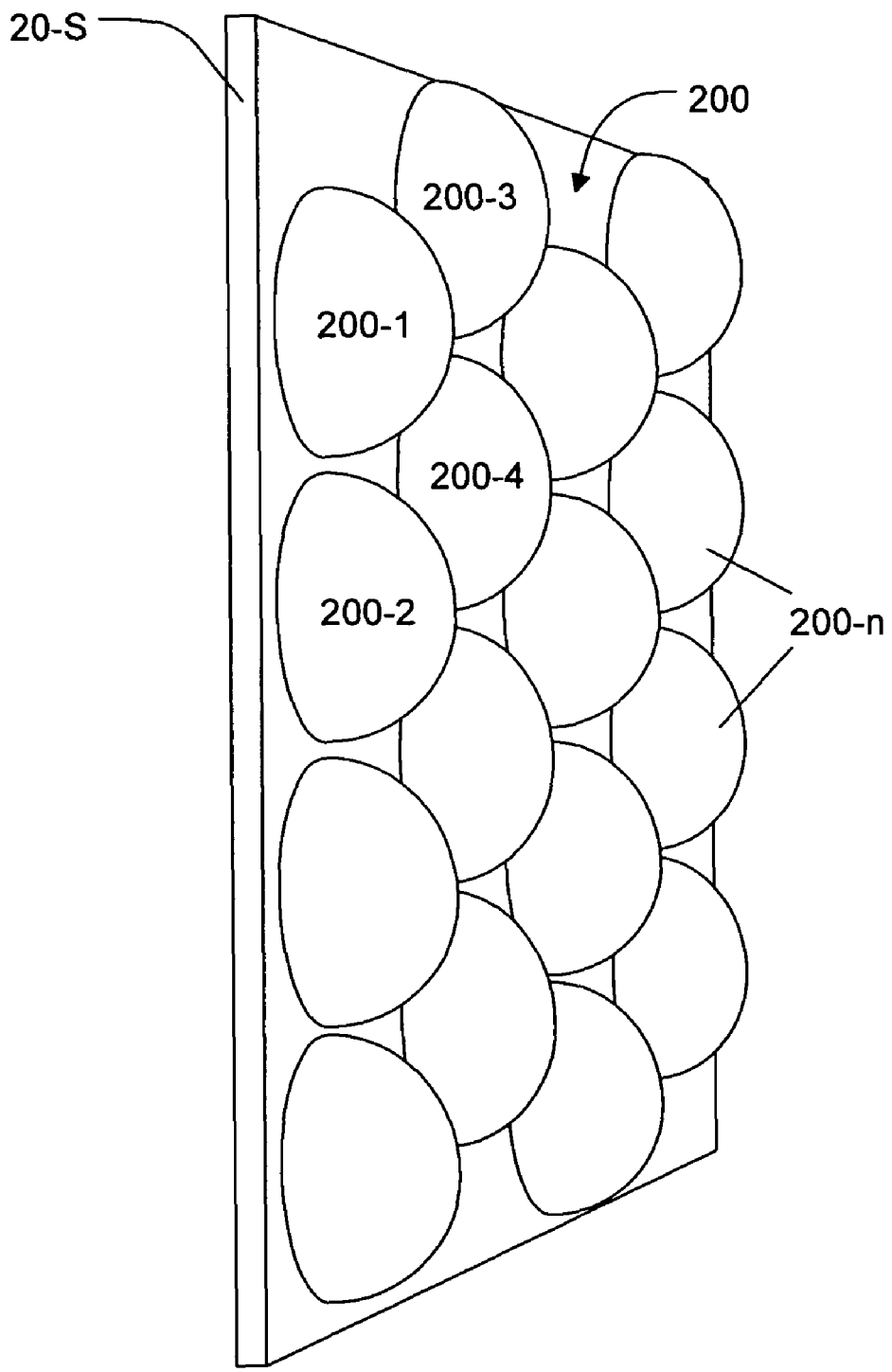
FIG. 4A illustrates a spherical lens array used as an optical layer for an LCD-based environment scanning device, according to an exemplary embodiment of the present invention.
Figure 4B:
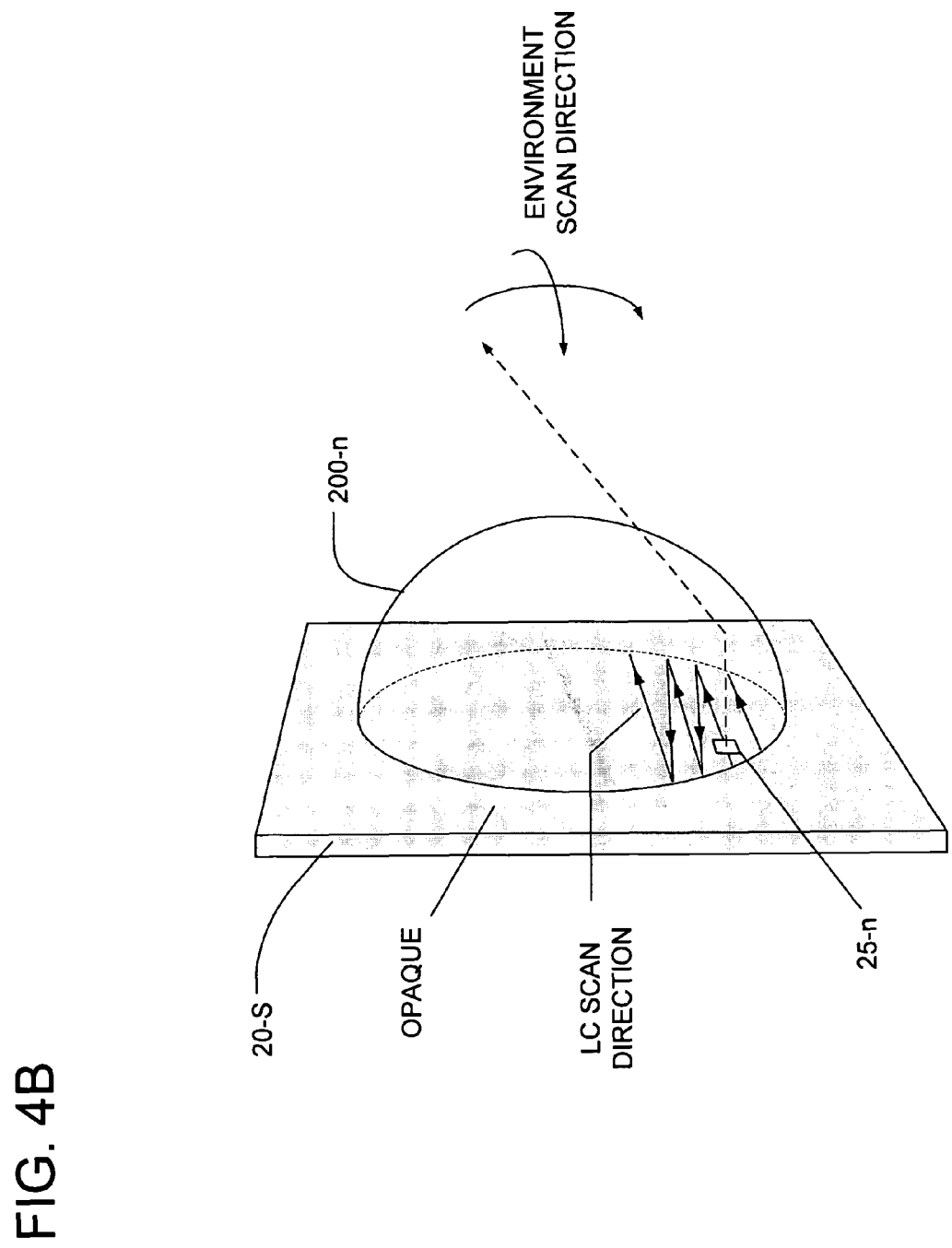
FIG. 4B illustrates a scanning operation of an LCD-based environment scanning device using a spherical lens array producing an optical path, according to an embodiment of the present invention.
Figure 4C:
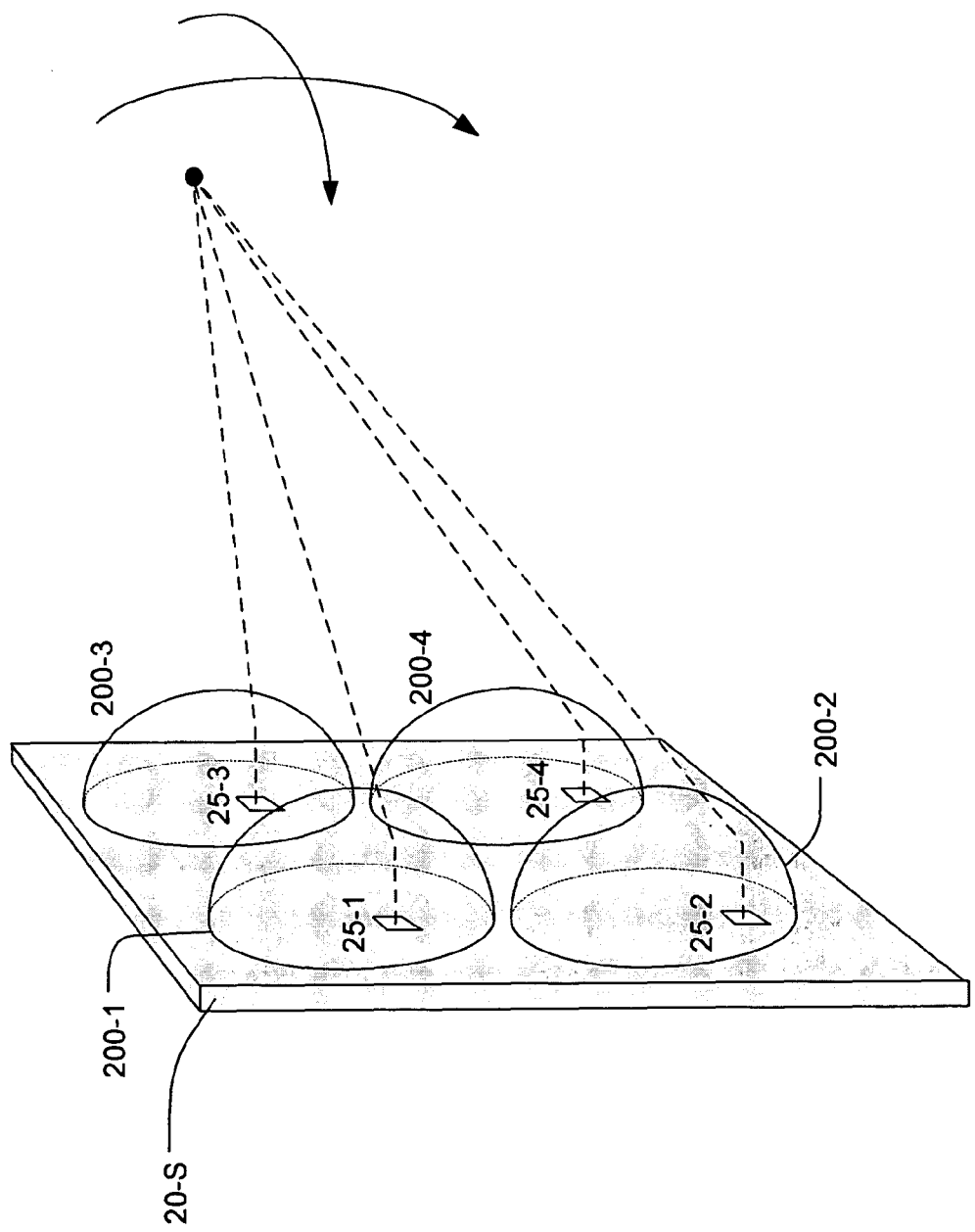
FIG. 4C illustrates a scanning operation of an LCD-based environment scanning device using a spherical lens array producing multiple optical paths that converge, according to an embodiment of the present invention.

For instance, as stated above, the optical layer 200 may comprise an array of spherical lenses 200-$n$ according to an alternative embodiment. This is illustrated in FIGS. 4A-4C. Particularly, FIG. 4A shows an array of spherical lenses 200-$n$ placed in front of the scanning portion 20-S of the LC layer 20 (including a set of lenses 200-1 ... 200-4 also referred to in FIG. 4C).

In this embodiment, the LC layer controller 300 may provide a transparent opening 25-$n$ in the LC layer 20 for each spherical lens 200-$n$ covering the scanning portion 20-S. Similar to earlier-described embodiments, the transparent openings 25-$n$ synchronously scan the respective portions of LC layer 20 that correspond to the lenses 200-$n$.

However, one difference in the embodiment utilizing spherical lenses 200-$n$ is that scanning may be performed in two dimensions (i.e., vertical and horizontal). Specifically, as shown in FIGS. 4B and 4C, each transparent opening 25-$n$ may comprise a relatively small block of LC cells, rather than a narrow vertical band. For example, the two-dimensional scanning pattern illustrated in FIG. 4B may be employed for each transparent opening 25-$n$ to ensure that the environment is scanned in both vertical and horizontal directions.

Furthermore, while the transparent openings 25-$n$ are synchronously scanned, the constant distances are maintained between neighboring or consecutive transparent openings 25-$n$. Such distances may be designed to make the resultant optical paths parallel or converging as they exit the LCD device 100.

For example, each transparent openings 25-$n$ may be synchronously scanned in such a manner that their resultant optical paths intersect the same arcuate portions of the corresponding spherical lens 200-$n$ at each scan interval. This would cause the exiting optical paths to be essentially parallel.

Alternatively, the transparent openings 25-$n$ may be scanned in such a manner that the optical paths converge after exiting the LCD device 100. This may be accomplished by maintaining relative distances between transparent openings 25-$n$ in such a manner that the resultant optical paths intersect different arcuate portions of the corresponding lenses 200-$n$ at each scan interval. An example of this is illustrated in FIG. 4C, in relation to lenses 200-1 ... 200-4 and their corresponding transparent openings 25-1 ... 25-4.

Next, the use of a marker signal for scanning the environment will be described. As previously stated, the marker signal may originate within the LCD device 100 or be generated externally. The case of originating the marker signal inside the LCD device 100 will be described first.

Figure 5A:
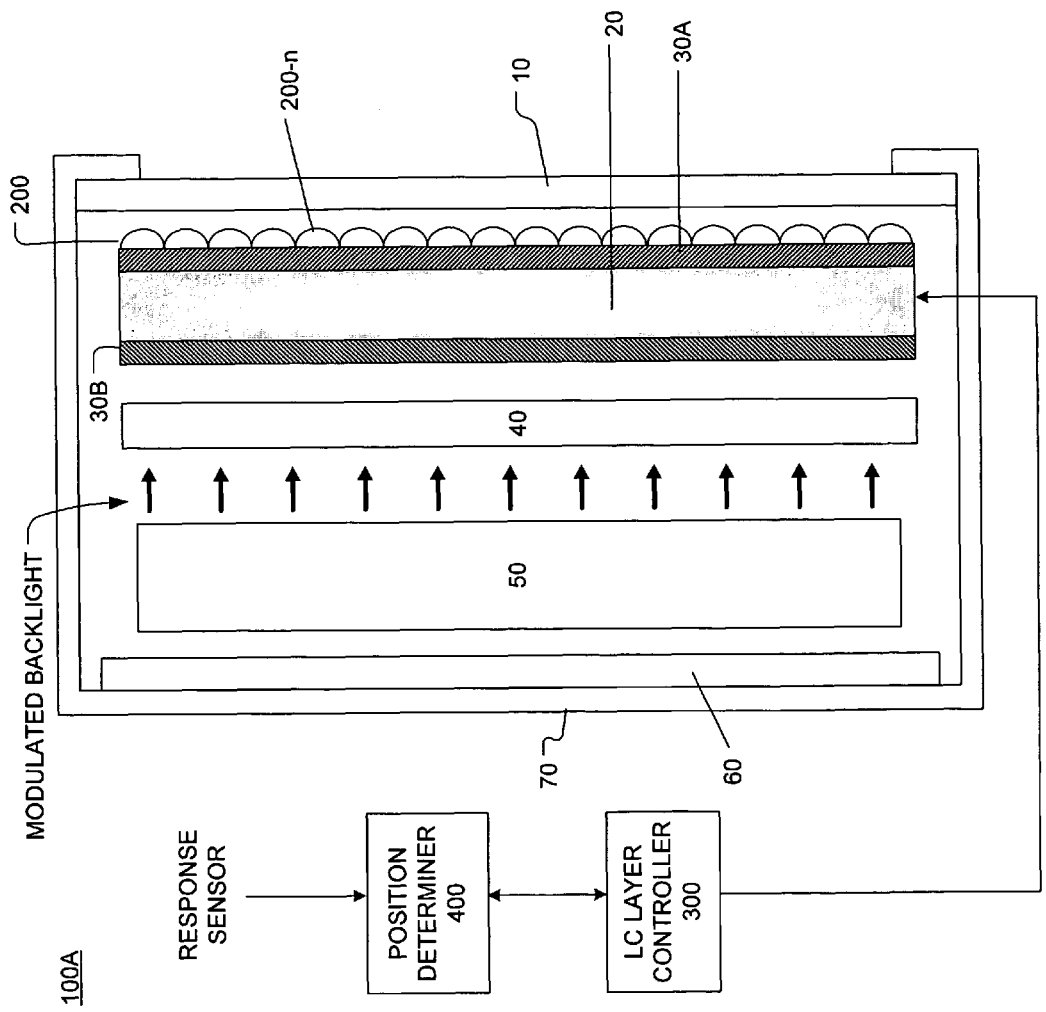
FIG. 5A illustrates an exemplary embodiment of the present invention in which a marker signal transmitter is implemented in the LCD stack of an LCD-based environment scanning device.

FIG. 5A illustrates an exemplary embodiment of the present invention in which a marker signal transmitter is implemented in the LCD stack of an LCD-based device 100. Particularly, the marker signal transmitter should be implemented behind the LC layer 20. Thus, as shown in FIG. 5A, the marker signal transmitter may comprise a traditional LCD backlight source 50. Specifically, while the device 100A is operating in environment scanning mode, the backlight source 50 may transmit modulated light toward the LC layer 20. According to conventional techniques, this backlight source 50 may be configured to emit light rays in a substantially uniform and parallel fashion toward the LC layer 20 (as illustrated by the arrows in FIG. 5A). Thus, as the modulated light (i.e., marker signal) passes through the LC layer 20, it follows the scanning optical path provided in the LC layer 20, under the control of the LC layer controller 300 (as previously described). Thus, the marker signal exits the LCD device 100 as an environment scanning beam, as illustrated in FIG. 5B. In this way, the LC layer controller 300 is able to control the marker signal to scan the environment simply by controlling the location of transparent opening(s) 25-$n$ (e.g., as described in connection with FIGS. 3B-3C and 4B-4C).

It should be noted that, while FIG. 5B illustrates a particular example where the LCD device 100A emits the marker signal into the environment as a beam of parallel rays, the device 100A may alternatively be designed to emit the marker signal as a beam of converging rays according to the principles already described.

The marker signal transmitter/backlight source 50 may be designed to modulate the marker signal in accordance with a "marker signature" i.e., some type of information (frequency, pattern, etc.) identifying it as a marker signal. A possible alternative to modulating the marker signal according to a particular signature might be to operate the marker signal transmitter/backlight source 50 in the infrared range.

Figure 5C:
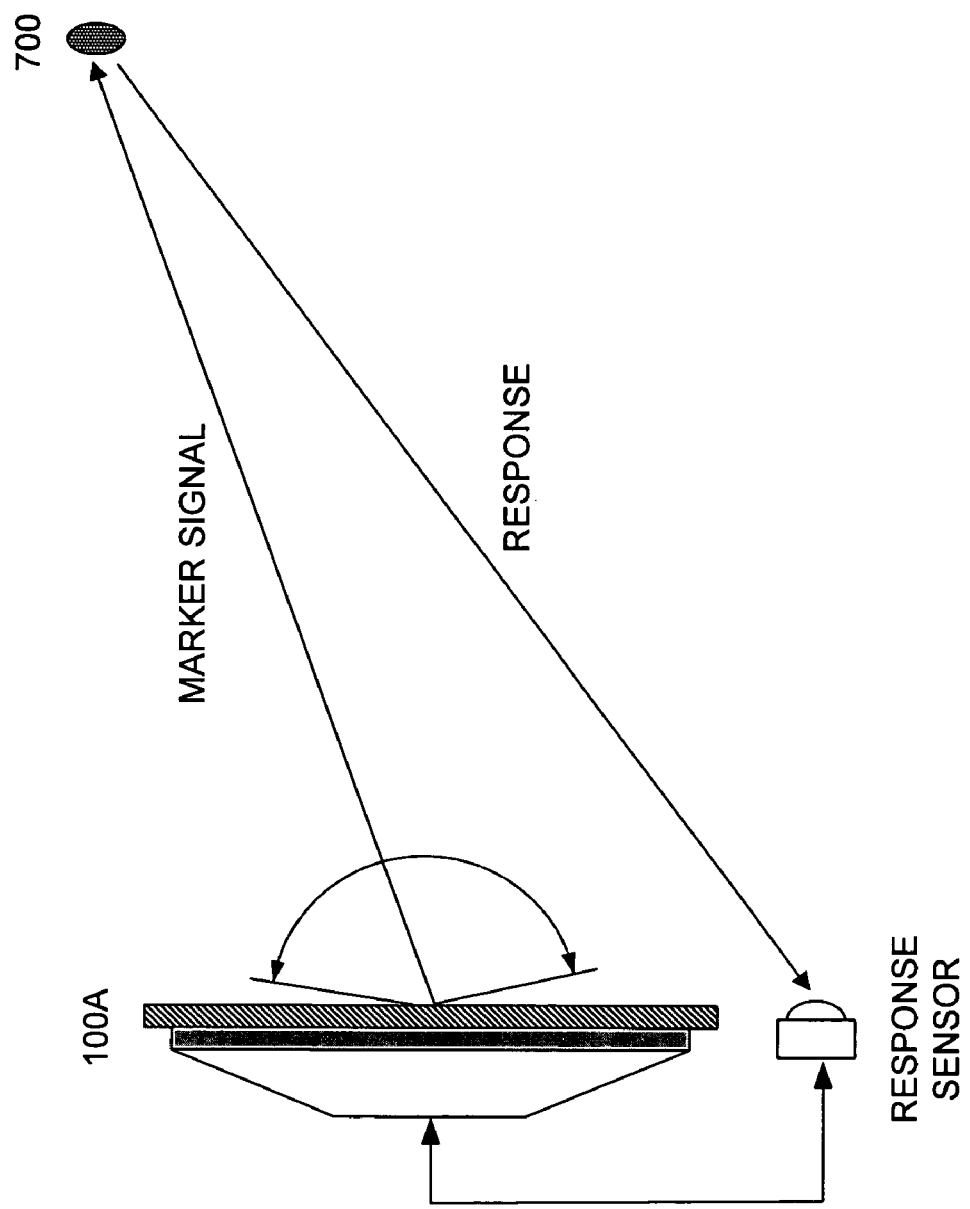
FIG. 5C illustrates an aspect of the embodiment in FIG. 5A, in which an external response sensor may be used for detecting the reaction of makers in the environment.

Referring again to FIG. 5A, the position determiner unit 400 may further be connected to a response sensor. Basically, as the marker signal strikes a marker 700 while scanning the environment, the response sensor is designed to detect the marker's 700 reaction. As illustrated in FIG. 5C, the response sensor may be an external sensor connected to the LCD device 100A. Alternatively, as shown in FIG. 5D, the response sensor may alternatively be implemented within the LCD stack of device 100A.

For instance, each marker 700 may be designed to reflect light modulated at the same carrier frequency. Thus, the LCD device 100A may be designed to detect such "passive" markers 700 by sensing a burst of light, which is modulated according to the marker signature.

Alternatively, the LCD device 100A may be used in conjunction with "active" markers 700 in the environment. For example, an active marker 700 might be configured to specifically detect the marker signal (e.g., to detect light modulated according to the marker signature). Thus, as the marker signal beam strikes an active marker 700 while scanning the environment, the marker 700 detects the beam and transmits an acknowledgment signal in response. The response sensor may be configured to detect such acknowledgment signals.

Referring again to FIG. 5A, the position determiner unit 400 is notified at the moment the response sensor detects the marker's 700 reaction to being struck by the marker signal. Thus, as the position determiner unit 400 receives such notification, it determines the relative position of the marker 700 based on the current direction of the marker signal.

Specifically, as the marker signal beam strikes a marker 700, the angular position of that marker 700 relative to the LCD device 100A directly corresponds to the direction of the marker signal beam. In turn, the direction of marker signal beam is dependent on the scan locations of the various transparent openings 25-$n$ provided in the LC layer 20 (according to principles described above). Thus, at the particular scan interval in which the marker 700 is detected, the position determiner unit 400 may determine the relative position of the marker 700 by receiving information from LC layer controller 300 regarding the current scan locations of the transparent openings 25-$n$.

Further, if an array of spherical lenses 200-$n$ is used (and the marker signal is scanned in both vertical and horizontal directions), the relative angular positions of the detected marker 700 may be obtained in both the horizontal and vertical axes. Furthermore, if the marker signal is emitted as a beam of converging rays, it might be possible to obtain information regarding the detected marker's 700 relative distance from the LCD display panel, if the level of convergence of the marker signal striking the target 700 can be determined.

Next, the alternative embodiment in which the marker signal is generated external to the LCD device 100 (i.e., by active targets 700) will be described in connection with FIGS. 6A and 6B.

Figure 6A:
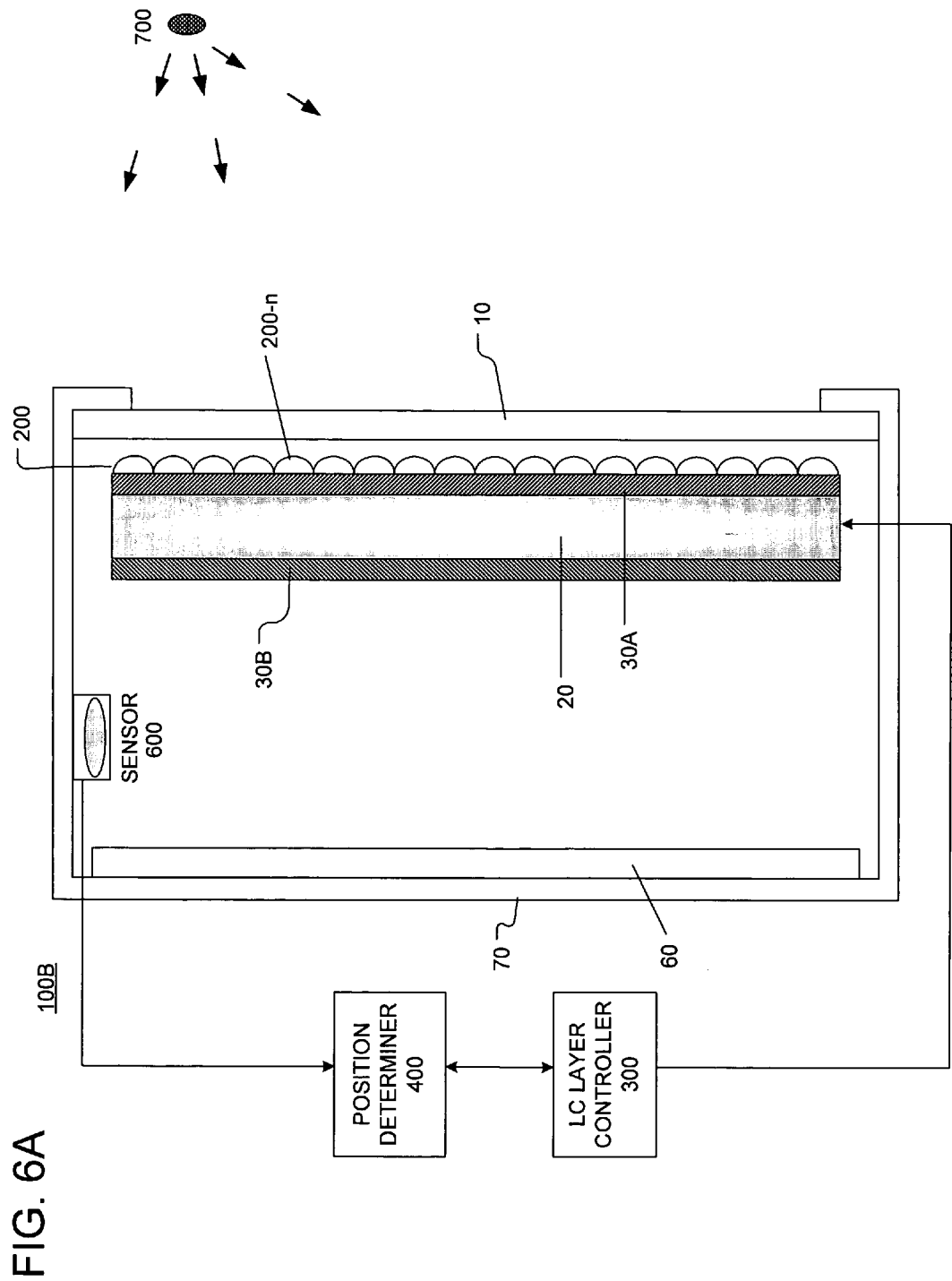
FIG. 6A illustrates an exemplary embodiment of the present invention in which a marker signal sensor is implemented in the LCD stack of an LCD-based environment scanning device.

Particularly, FIG. 6A illustrates an exemplary embodiment of the present invention in which a marker signal sensor 600 is implemented in the LCD stack of an LCD device 100B. In the embodiment of FIG. 6A, each marker 700 in the environment is active in the sense that it actively transmits a marker signal (e.g., light modulated according to a marker signature). The marker signal sensor 600 may be configured to specifically sense the marker signal (e.g., sense light modulated according to the marker signature). Further, while device 100B operates in environment scanning mode, the LC layer controller 300 controls the LC layer 20 to provide a scanning optical path, consistent with principles described above.

FIG. 6B particularly illustrates the manner in which the LCD device 100B detects markers 700 during environment scanning mode. Specifically, for each scan interval corresponding to the scanning optical path, the only environmental light rays allowed to pass through the LC layer 20 are those that strike the lenses 200-n at a particular angle. This is due to the scan positions of the transparent openings 25-n in the scanning portion 20-S of LC layer 20. Thus, during a particular scan interval, as shown in FIG. 6B, the scanning optical path will be configured to allow the passage of light rays (i.e., marker signal) emanating directly from the marker 700 through the LC layer 20 toward the marker signal sensor 600. In a sense, the scanning optical path imposes directionality on the marker signal, by filtering the signal according to direction as it passes through the LC layer 20.

For each scan interval when the marker signal sensor 600 detects a marker signal (e.g., senses a burst of intensity of modulated light), the sensor 600 notifies the position determiner unit 400. In turn, the position determiner unit 400 may obtain information from the LC layer controller 300 regarding the current scan positions of the transparent openings 25-n, in order to determine the relative position of the source of the marker signal (i.e., marker 700).

One possible use of the present invention is to detect the position of viewers as they watch the LCD device 100. Particularly, it is contemplated that LCD applications may be capable of displaying three-dimensional (3-D) images by transmitting slightly different images to the left and right eyeballs of a viewer. To do this, information regarding the precise location of the viewer's left and right eyeballs is needed.

Thus, the LCD device 100 of the present invention might be used in such applications to scan the viewing environment and determine the location of viewers' left and right eyeballs. Specifically, a pair of markers 700 may be attached to each viewer, such that each marker 700 is at a fixed location relative to a corresponding eyeball. E.g., the markers 700 may be attached to a hat, eyeglasses, or other accessory worn by the viewer.

As such, the present invention might be suitable for military aircraft applications, as illustrated in FIG. 7. In military aircraft settings, pilots typically wear helmets. Markers may then be placed on pilots' helmets and used to detect the positions of the left and right eyeballs of the pilots. Two pilots are shown in FIG. 7 wearing such helmets. Specifically, markers 700R and 700L are placed on each pilot's helmet at locations corresponding to the right and left eyes of the first pilot.

For purposes of example, FIG. 7 illustrates an LCD device 100, which generates the marker signal beam to scan the environment. Also, FIG. 7 illustrates an external response sensor. However, the other above-described embodiments could also be used in this application (e.g., the response sensor is contained within the device 100, or the marker signal is originated by each marker 700R and 700L).

In FIG. 7, two pilots are in the viewable range of the LCD device 100. To determine the relative angular positions for the left and right eyeballs of the pilots, LCD device 100 scans the environment using the marker signal beams, according to principles described above. The LCD device 100 may be specifically designed to search for companion sets of markers 700R and 700L, corresponding to pairs of eyeballs. For example, when a first marker (e.g., 700R) is found, the device 100 may next search for its companion marker (e.g., 700L). Thus, if another marker is found in proximity of the first detected marker, the pair of detected markers is confirmed to be a display viewer associated with the left and right eyeballs of a pilot. However, if no companion marker is found for the first detected marker, the first detected marker may be discarded. Furthermore, the LCD device 100 of FIG. 7 may periodically reconfirm the presence and positions of markers 700R and 700L for each pilot.

Although some aspects of the present invention have been described in the context of 3-D LCD displays, it should be realized that the principles of the present invention could be used in other applications.

Also, with various exemplary embodiments being described above, it should be noted that such descriptions are provided for illustration only and, thus, are not meant to limit the present invention defined by the claims below. The present invention is intended to cover any variation or modification of these embodiments, which do not depart from the spirit or scope of the present invention.

What is claimed is:

1. A device configured to optically scan its environment for markers comprising:
   a liquid crystal (LC) layer configured to selectively pass light therethrough;
   a controller configured to control the LC layer to provide a scanning optical path for a directional marker signal by providing one or more transparent openings in the LC layer, each transparent opening scanning at least a portion of the LC layer; and
   a position determining unit configured to determine a position coordinate of each marker based on current scan locations of the one or more transparent openings when the directional marker signal is detected.

2. The device of claim 1, further comprising an array of lenses disposed in front of the LC layer, wherein
   for each lens in the array, the controller provides a transparent opening in the LC layer to scan the portion of the LC layer corresponding to the lens, and
   the directional marker signal comprises light rays passing through the transparent openings corresponding to the array of lenses.

3. The device of claim 2, wherein during a particular scanning interval, the directional marker signal traverses the environment in a particular direction with respect to the device, the particular direction being determinable based on:
   the distance between the current scan locations of neighboring transparent openings, and
   a height of the lenses in the array.

4. The device of claim 2, wherein
   the controller is configured to provide the transparent openings in such a manner that the light rays are parallel after passing through the respective lenses, and
   the determined position coordinate of each marker indicates an angular position of the marker relative to the device.

5. The device of claim 2, wherein
   the controller is configured to provide the transparent openings in such a manner that the light rays converge after passing through the respective lenses, and
   the determined position coordinate of each marker indicates an angular position of the marker and distance relative to the device.

6. The device of claim 2, wherein each of the lenses in the array is cylindrical.

7. The device of claim 2, wherein each of the lenses in the array is spherical.

8. The device of claim 1, wherein each marker corresponds to an eyeball of a viewer.

9. A device, configured to optically scan its environment for markers, comprising:
   a liquid crystal (LC) layer configured to selectively pass light therethrough,
   a controller configured to control the LC layer to provide a scanning optical path for a marker signal external to the device, wherein the marker signal is light modulated according to a marker signature, and
   a marker signal sensor disposed behind the LC layer, the marker signal sensor being configured to detect light modulated according to the marker signature.

10. The LCD device of claim 9, wherein each marker is configured to modulate light according to the marker signature and to transmit the modulated light thereby actively transmitting the marker signal to the device.

11. The device of claim 10, further comprising:
   an array of lenses disposed in front of the LC layer, wherein
      for each lens in the array, the controller provides a transparent opening in the LC layer to scan the portion of the LC layer corresponding to the lens, and
      at a particular scan interval, the marker signal sensor performs marker signal detection by sensing light passing through the transparent openings corresponding to the array of lenses and determining whether the sensed light is modulated according to the marker signature.

12. The device of claim 11, wherein when the marker signal is detected during the particular scan interval, a position coordinate of the marker that transmitted the marker signal is determinable based on the distance between current scan locations of neighboring transparent openings and a height of the lenses in the array.

13. A device configured to optically scan its environment for markers, the device comprising:
   a liquid crystal (LC) layer configured to selectively pass light therethrough,
   a controller configured to control the LC layer to provide a scanning optical path for a directional marker signal,
   a marker signal transmitter disposed behind the LC layer, and
   an array of lenses disposed in front of the LC layer.

14. The device of claim 13, wherein
   in controlling the LC layer to provide the scanning optical path, the controller provides transparent openings in the LC layer, each transparent opening scanning at least a portion of the LC layer, and
   when each marker is detected, a position coordinate of the detected marker is determinable based on current scan locations of the transparent openings when the marker is detected.

15. The device of claim 14, wherein
   for each lens in the array, the controller provides a transparent opening in the LC layer to scan a portion of the LC layer corresponding to the lens, and
   the marker signal comprises one of visible and infrared rays transmitted by the marker signal transmitter through the transparent openings corresponding to the array of lenses.

16. The device of claim 15, wherein during a scanning interval the marker signal is transmitted from the device in a particular direction according to:
   the distance between the current scan locations of neighboring transparent openings, and
   a height of the lenses in the array.

17. A device, configured to optically scan its environment for markers, the device comprising:
   a liquid crystal (LC) layer configured to selectively pass light therethrough,
   a controller configured to control the LC layer to provide a scanning optical path for a marker signal, and
   a response sensor operably connected to the device, the response sensor being configured to detect a reaction from each marker in response to being struck by the marker signal,
   wherein a locational coordinate of each marker in the environment is determinable based on a particular direction of the marker signal from the device during a scan interval in which the reaction is detected.

18. The system of claim 17, further comprising an active marker in the environment, the active marker being configured to:
   detect the marker signal transmitted from the device, and
   send an acknowledgement signal, which is detectable by the response sensor.

19. The system of claim 17, further comprising a passive marker in the environment, wherein
   when the passive marker is struck by the marker signal, the response sensor detects the marker signal being reflected by the passive marker.

20. A device, which is configured to optically scan its environment for markers, the device comprising:
   a liquid crystal (LC) layer configured to selectively pass light therethrough, and
   a controller configured to control the LC layer to provide a scanning optical path for a directional marker signal,
   wherein the device operates according to the following interleaved modes:
   an environment scan mode during which the controller controls the LC layer to provide the scanning optical path;
   an image display mode during which the controller controls the LC layer to display an image,
   wherein, while operating in image display mode, the controller performs image control based on data obtained according to the environment scan mode.

* * * * *